United States Patent
Want et al.

(10) Patent No.: US 6,216,087 B1
(45) Date of Patent: Apr. 10, 2001

(54) INFRARED BEACON POSITIONING SYSTEM

(75) Inventors: Roy Want, Los Altos; David Goldberg, Palo Alto; Anthony G. LaMarca, Redwood City; Todd A. Cass, San Francisco; Mark D. Weiser, Palo Alto, all of CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/447,876

(22) Filed: Nov. 23, 1999

(51) Int. Cl.[7] .................................................. G06F 165/00
(52) U.S. Cl. .......................... 701/207; 701/214; 701/216; 701/217
(58) Field of Search .................................... 701/207, 214, 701/216, 217; 342/70, 74, 385, 386, 457; 340/815

(56) References Cited

U.S. PATENT DOCUMENTS

| | | | |
|---|---|---|---|
| 4,764,984 | | 8/1988 | Franke et al. ........................ 455/619 |
| 4,873,776 | * | 10/1989 | Hoffart .................................. 40/572 |
| 4,912,334 | | 3/1990 | Anderson ........................... 250/495.1 |
| 5,121,126 | * | 6/1992 | Clagett ................................. 342/419 |
| 5,307,194 | | 4/1994 | Hatton et al. ......................... 359/154 |
| 5,396,243 | * | 3/1995 | Jalink, Jr. et al. ...................... 342/54 |
| 5,642,303 | * | 6/1997 | Small et al. ..................... 364/705.05 |
| 5,742,233 | * | 4/1998 | Hoffman et al. ..................... 340/573 |
| 5,793,280 | * | 8/1998 | Hincher ................................ 340/326 |
| 5,804,829 | * | 9/1998 | Palmer ............................. 250/504 H |
| 5,929,777 | * | 7/1999 | Reynolds ........................ 340/825.49 |
| 5,986,581 | | 11/1999 | Magdaleno, II et al. ............ 340/953 |

FOREIGN PATENT DOCUMENTS

2275141 * 8/1994 (GB) .

* cited by examiner

Primary Examiner—William A. Cuchlinski, Jr.
Assistant Examiner—Marthe Marc-Coleman
(74) Attorney, Agent, or Firm—Andrew D. Ryan

(57) ABSTRACT

A physical positioning system for a portable computing device equipped with an infrared receiver includes a light source removably attachable to a lighting fixture that supplies electrical power at a determined voltage. The light source has an attached voltage converter to provide a reduced supplied voltage. An infrared beacon is powered at the reduced supplied voltage through an electrical connection to the voltage converter. The infrared beacon broadcasts a data signal representative of a physical location.

18 Claims, 4 Drawing Sheets

INFRARED BEACON POSITIONING SYSTEM

This application relates to U.S. application No. 09/448,024, filed Nov. 23, 1999 concurrently herewith.

FIELD OF THE INVENTION

The present invention relates to use of infrared beacons for positioning. More particularly, the present invention relates to navigation and coordination of portable computing equipment using infrared beacons.

BACKGROUND OF THE INVENTION

Low cost portable computing devices such as handheld or palm-sized computers are widely available. Such devices can support local communication between nearby computers, or more generally can support wireless network or internetwork communications. Users equipped with suitable portable computers can, for example, exchange e-mail, browse the web, utilize mapping software, control nearby computer peripherals (e.g. printers), or receive information from local devices (e.g. job status of a printer). As will be appreciated, flexibility and utility of various applications can be enhanced if the precise spatial location of the portable computing device is known. Knowing the location of the portable computing device (with a precision of several meters or so) permits construction of user specific maps, transfer of location information to others, and receipt of location information for nearby computational or real world resources (e.g. answering such questions as "where is the nearest printer" or "where is the nearest coffee shop"). For this reason, having easily determinable and reliable position information is a useful feature.

However, spatial localization with low cost devices can be difficult. Devices incorporating GPS receivers often do not work indoors because of poor radio reception and can require a substantial amount of time to determine position with a required accuracy. In many areas, there may not be any differential GPS availability to gain the necessary meter level precision for greatest utility. Other wireless schemes for localizing spatial position are generally not sufficiently precise (e.g. digital cellular telephone service areas with 1000 meter errors), or too expensive (inertial navigation systems).

SUMMARY OF THE INVENTION

According to the present invention, one solution for determining spatial location is based on low cost infrared equipped devices and infrared beacons. Outdoor situated infrared beacons that broadcast a unique identification number can be precisely located outdoors using differential GPS in a one-time procedure. Indoor situated infrared beacons that broadcast a unique identification number can be precisely located indoors using architectural plans in combination with accurate survey maps or external GPS of the building. Relative location is even of infrared beacons is even simpler. For example, each room in an office building can be equipped with a unique identification number, and geographic references are made with respect to room numbers rather than x,y,z absolute position. In any case, whether absolute or relative positioning is used, the location information is linked to the unique identification number available over the Internet or through local database spatial localization services. In operation, a portable computing devices equipped with an infrared receiver can receive the data signal from the infrared beacon, enabling high precision determination of physical location both indoors or outdoors. In certain embodiments, a GPS receiver integrated with a portable computer can be used to roughly determine location, with more precise positioning being handled by reference to infrared beacons.

In preferred embodiments, an infrared beacon is integrated into convention incandescent, fluorescent, or high intensity discharge lamps (e.g. metal halide, high or low pressure sodium lamps) suitable for indoor or outdoor usage. The infrared beacon includes a light source removably attachable to lighting fixtures that supply electrical power at a determined voltage and a voltage converter electrically and physically connected to the light source to provide a reduced supplied voltage. For indoor usage, electrical power is typically supplied at 110 Volts AC, and is converted to less than 5 or 6 volts DC by the voltage converter. Outdoor power supplies are often higher (220 Volts AC or greater), and power supplied by the voltage converter may also be slightly higher.

In operation, the infrared beacon, powered by the voltage converter, continuously, intermittently, or in response to an interrogatory signal, broadcasts a data signal. This data signal can be predetermined, and is typically a series of infrared pulses adhering to IrDA standards. In certain embodiments, a microcontroller and oscillator are attached to trigger the microcontroller to initiate the electrical pulse train resulting in broadcast of the data signal. Alternatively, a special trigger circuit responsive to infrared, optical, physical (e.g. pushbutton or switch), or radiofrequency input can be used, alone or in combination with a microcontroller or oscillator circuit, to initiate broadcast of the data signal.

Additional functions, objects, advantages, and features of the present invention will become apparent from consideration of the following description and drawings of preferred embodiments.

DETAILED DESCRIPTION OF THE INVENTION

Figure 1:
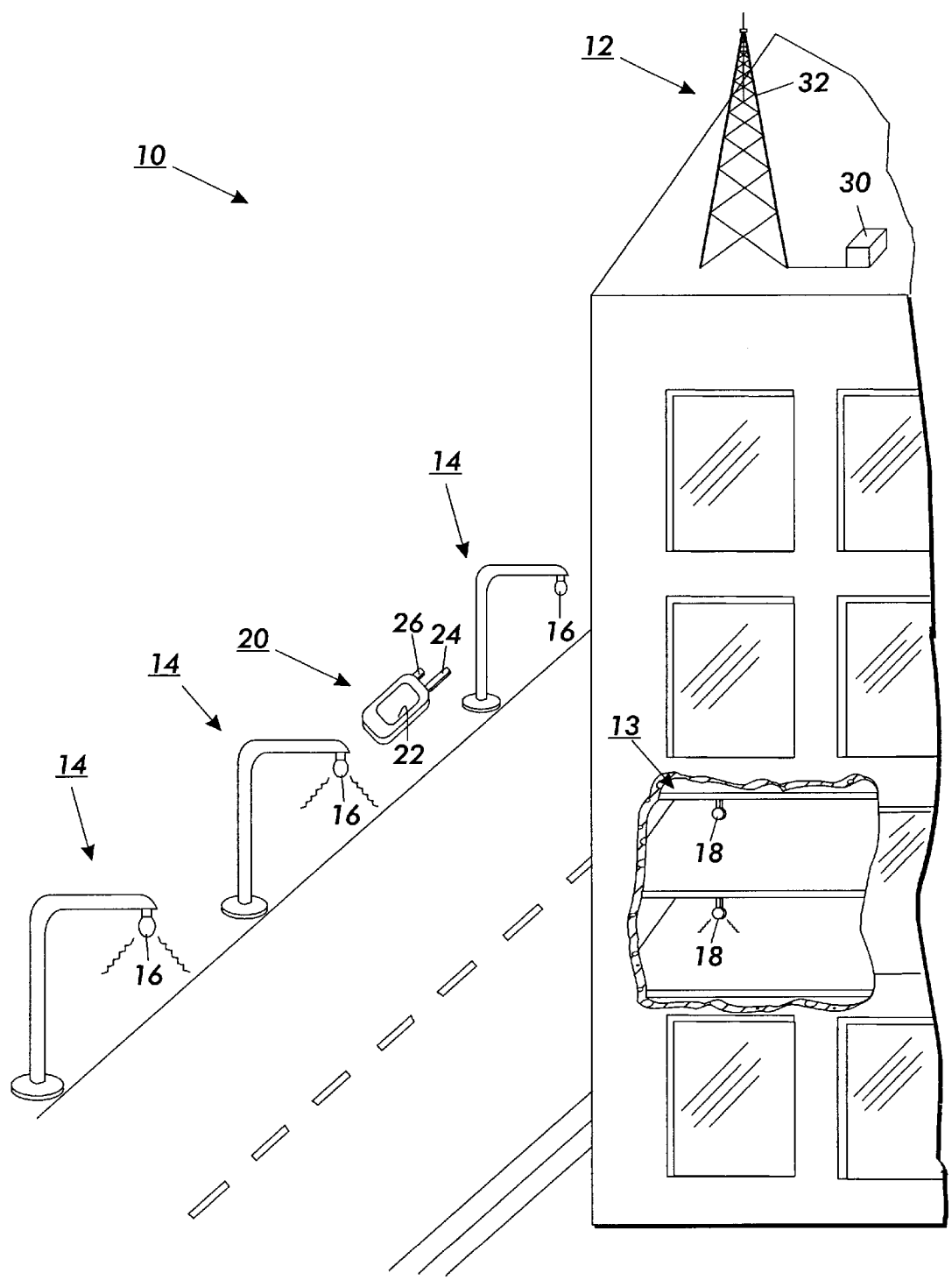
FIG. 1 schematically illustrates usage of embedded infrared beacons in outdoor and indoor environments with the aid of a portable computer equipped with both infrared and radio transceivers.

As seen in FIG. 1, a high precision positioning system 10 for determining spatial location can utilize a low cost infrared equipped portable computing device 20, lightpole 14 mounted outdoor infrared beacons 16, or ceiling 13 mounted indoor infrared beacons 18 to provide location specific information to a user. In operation, infrared beacons that broadcast a unique identification number are precisely located using, for example, differential GPS in a one-time procedure. The location information linked to the unique identification number is available over the Internet or through local database spatial localization services. A cellular or radio system 12 including broadcast tower 32 and connection to internet or computing services (box 30) can support such wireless transmission to wireless receiver 24 on portable computing device 20. A user with the portable computing device 20 equipped with an infrared receiver 26 can receive the data signal from the infrared beacons 16 or 18, enabling high precision determination of physical location both indoors or outdoors. Mapping software displayable on a screen 22 can be optionally used to assist in spatial locating or tracking. As will be appreciated, in certain embodiments, a GPS receiver integrated with the portable computer 20 can be used to roughly determine location from differential GPS transmitters, with more precise positioning being handled by reference to infrared beacons.

In preferred embodiments, an infrared beacon is integrated into convention incandescent, fluorescent, or high intensity discharge lamps (e.g. metal halide, high or low pressure sodium lamps) suitable for indoor or outdoor usage. The infrared beacon includes a light source removably attachable to lighting fixtures that supply electrical power at a determined voltage. Advantageously, integration of an infrared beacon for use in ceiling mounted conventional lighting fixtures generally assures that the beacon signal information is readily available indoors, since such lights are optimally located to direct light to all parts of a room. In operation, the infrared beacon continuously, intermittently, or in response to an interrogatory signal, broadcasts the data signal. This data signal can be predetermined, and is typically a series of infrared pulses adhering to IrDA standards. In certain embodiments, a microcontroller or and oscillator are attached to trigger the microcontroller to initiate the electrical pulse train resulting in broadcast of the data signal. Alternatively, a special trigger circuit responsive to infrared, optical, physical (e.g. pushbutton or switch), or radiofrequency input from portable computing device 20 can be used, alone or in combination with a microcontroller or oscillator circuit, to initiate broadcast of the data signal.

Figure 2:
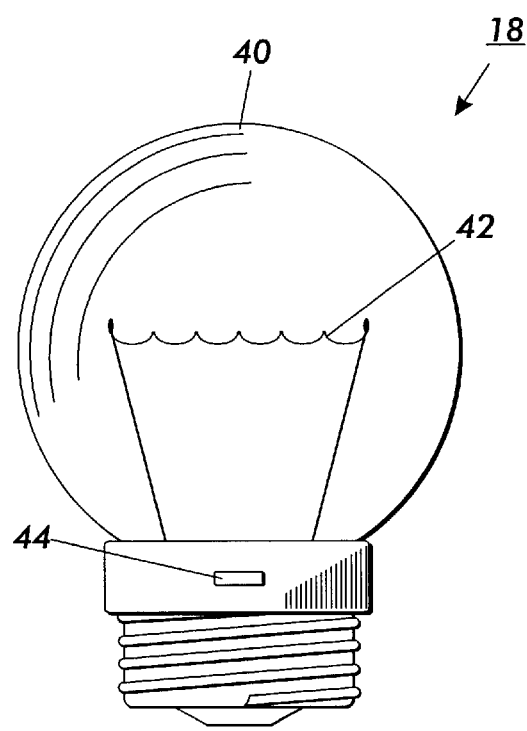
FIG. 2 shows an infrared beacon embedded in an incandescent light bulb.
Figure 3:
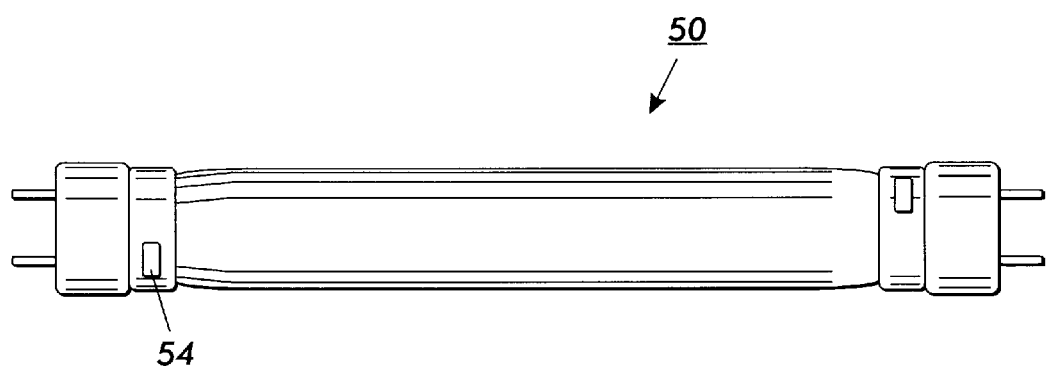
FIG. 3 shows an infrared beacon embedded in a fluorescent light bulb.

As will be appreciated, conventional lighting fixtures will readily support infrared beacons in accordance with the present invention. For example, as seen in FIG. 2 shows an infrared beacon assembly 18 having an infrared beacon 44 embedded in an incandescent light bulb 40. A lighting element 42 provides incandescent lighting, while the infrared beacon 44 can provides data signals. Similarly, FIG. 3 shows an infrared beacon 54 for providing data signals embedded in a fluorescent light bulb 50.

Figure 4:
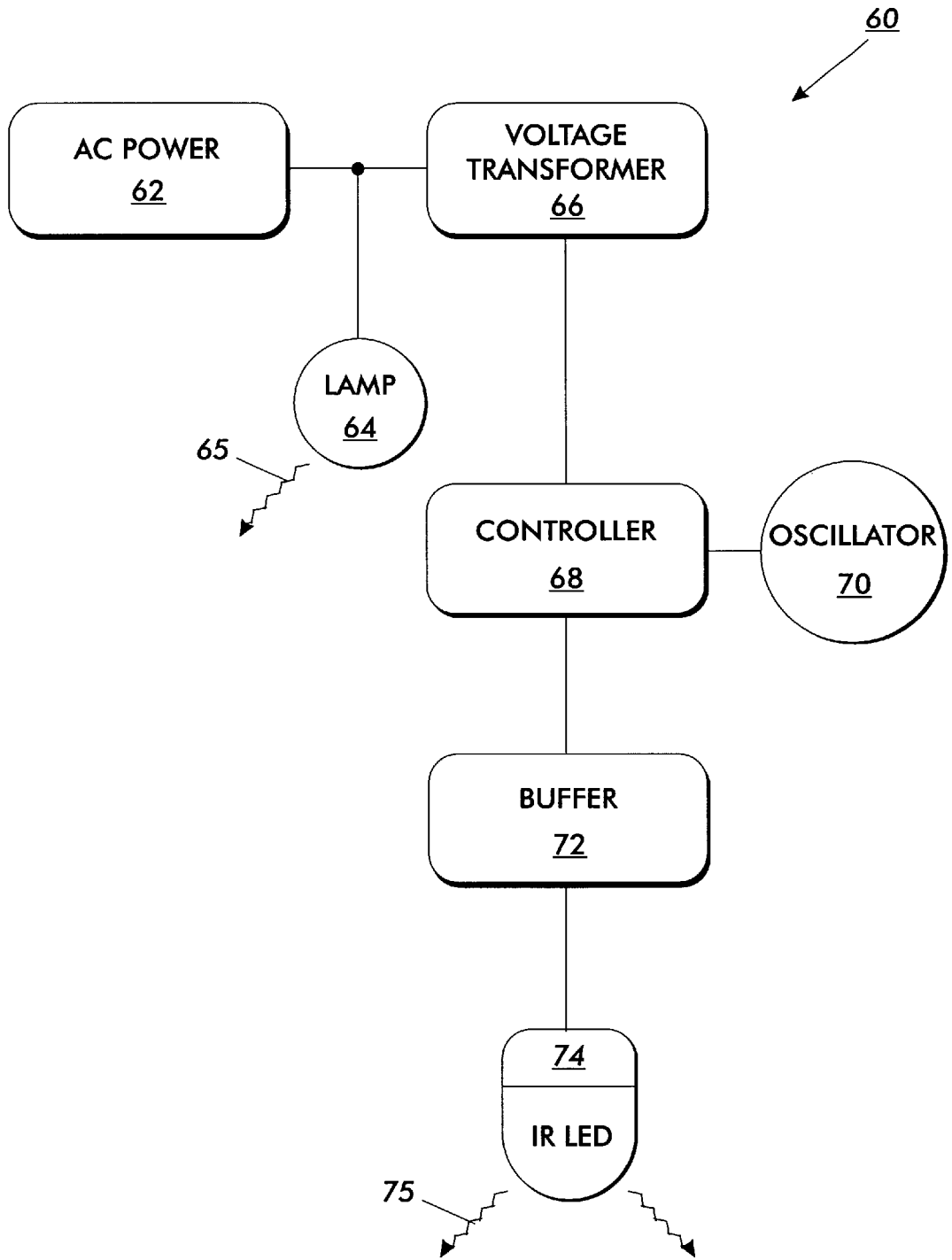
FIG. 4 is a schematic illustrating construction of an infrared beacon.

As seen in FIG. 4, an infrared beacon assembly 60 is powered by an alternating current power supply 62 (typically household current) that also powers a conventional lamp 64 for producing incandescent or fluorescent light 65. The beacon assembly 60 has a voltage transformer 66 that can convert input electrical power to the low direct current and low voltages required by a conventional infrared LED 74 for emitting an infrared data signal 75 as directed by a combination of controller 68, oscillator 70 and buffer 72.

The voltage transformer 66 generally converts a 110 volt alternating current to less than 10 volts direct current, with 3–6 volts DC being typically required for most applications. Conventional transformers or switch mode devices can be used. Since power consumption of the infrared beacon assembly 60 is on average on the order of 50 mW (although peak power may be substantially greater), heating effects in the transformer are negligible. In certain alternative embodiments, the lamp 64 can be used as a dropper resistor, with a small resistor being placed in series with the lamp 64. Voltage across this series resistor can be fed into a voltage regulator circuit to provide a stable current supply when the lamp 64 is turned on.

The controller 68 can be implemented with analog circuitry, with a general purpose microcontroller, or with an ASIC FSM. Typically, a four bit processor or dedicated ASIC is used to send a repeating stream of unique identifying pulses to the buffer 72, with the pulse sequence representing a globally or locally unique identification number. Alternatively, the pulse sequence can provide information in addition to identification, including sensor data (e.g. temperature) or informational details about an area (e.g. street number, enhanced location information). In preferred embodiments, the pulses comply with IrDA connectionless packet layout, to simplify recognition and interpretation by IrDA computing devices.

The repetition rate of controller 68 is optionally directed by oscillator 70. For example, an oscillator with a period of 10 seconds can be used to trigger the controller 68 to wake-up and initiate a pulse train fed to buffer 72 (which can be a simple FET or other suitable device). Each pulse is used to drive current to the IR LED 74 to emit data signal 75.

Figure 5:
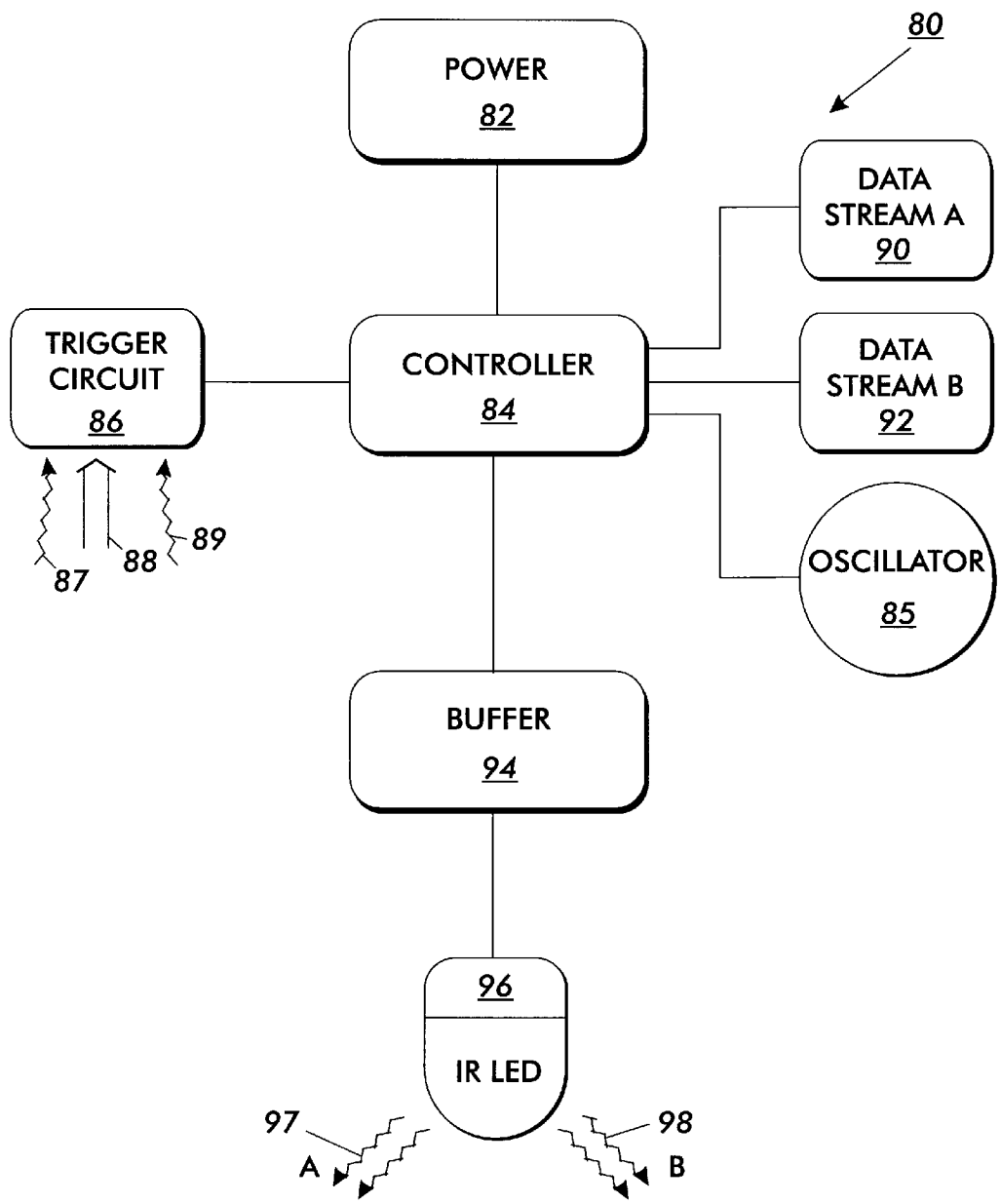
FIG. 5 is a schematic illustrating construction of an infrared beacon capable of providing alternative data streams.

An alternative embodiment capable of providing various infrared data streams 97 or 98 in response to specific triggers is schematically illustrated in FIG. 5. Similar to the embodiment of FIG. 4, an infrared beacon trigger assembly 80 is powered by an alternating current power supply 82 (typically household current) that also powers a conventional lamp (not shown) for producing incandescent or fluorescent light. The power supply 82 of the beacon trigger assembly 80 has a voltage transformer that can convert input electrical power to the low direct current and low voltages required by a conventional infrared LED 96 for emitting an infrared data signals 97 or 98 as directed by a combination of controller 84, oscillator 85 and buffer 94.

Unlike the embodiment of FIG. 4, the infrared beacon trigger assembly 80 further includes a trigger circuit 86. The trigger circuit can be optionally activated by a radio signal 87, sensor input 88 (e.g. physical user triggered switch, pressure or motion sensor, light sensor), or user directed light beam 89 (e.g. infrared or optical laser). Depending on trigger conditions, data stream A (box 90) or data stream B (box 92) can be converted by controller 84 into a pulse train for broadcast respectively as data signals 97 or 98. As will be appreciated, the data signals can be identification numbers, location information, information specific to a geographic locale, time dependent information (e.g. weather/temperature conditions for site) or any other desired data broadcast.

As those skilled in the art will appreciate, other various modifications, extensions, and changes to the foregoing disclosed embodiments of the present invention are contemplated to be within the scope and spirit of the invention as defined in the following claims.

What is claimed is:

1. A physical positioning system comprising:
    a light source removably attachable to a lighting fixture that supplies electrical power at a determined voltage, the light source having an attached voltage converter adapted to provide a reduced supplied voltage;
    an infrared beacon powered at the reduced supplied voltage through an electrical connection to the voltage converter, the infrared beacon adapted to broadcast a data signal representative of a physical location; and
    a microcontroller functionally associated with the voltage converter and the infrared beacon to generate an electrical pulse train convertible by the infrared beacon into a predetermined series of infrared pulses.

2. The physical positioning system of claim 1 wherein the data signal is a predetermined series of infrared pulses.

3. The physical positioning system of claim 1 further comprising a portable computing device equipped with an infrared receiver adapted to receive the data signal from the infrared beacon and to determine its physical location.

4. The physical positioning system of claim 3 wherein the portable computing device further comprises a global positioning system receiver.

5. The physical positioning system of claim 3 wherein the infrared beacon further comprises an infrared trigger mechanism to activate broadcast of the data signal and wherein the portable computing device further comprises an infrared beam adapted to activate the trigger mechanism.

6. The physical positioning system of claim 3 wherein the infrared beacon further comprises a radio trigger mechanism to activate broadcast of the data signal and wherein the portable computing device further comprises a radio broadcast adapted to activate the trigger mechanism.

7. The physical positioning system of claim 3 wherein the infrared beacon is configured to selectively broadcast a data signal and wherein the portable computing devices is equipped with an infrared receiver to receive the data signal from the infrared beacon.

8. The physical positioning system of claim 3 wherein the infrared beam is adapted to selectively broadcast more than one data stream in response to predefined conditions.

9. The physical positioning system of claim 1 wherein the light source is at least one of an incandescent, fluorescent, and high intensity discharge lighting device.

10. The physical positioning system of claim 9 wherein the high intensity discharge lighting device is at least one of metal halide and sodium.

11. The physical positioning system of claim 1 wherein the data signal further comprises at least one of identification information, location information, geographic information, time dependent information, weather information, and temperature information.

12. The physical positioning system of claim 1 further comprising a trigger circuit responsive to at least one of an optical input, pressure input, and motion input.

13. The physical positioning system of claim 1 wherein the lighting fixture is associated with at least one of a pole and a structure.

14. A physical positioning system comprising:
a light source removably attachable to a lighting fixture that supplies electrical power at a determined voltage, the light source having an attached voltage converter adapted to provide a reduced supplied voltage;
an infrared beacon powered at the reduced supplied voltage through an electrical connection to the voltage converter, the infrared beacon adapted to broadcast a data signal representative of a physical location;
a microcontroller attached between the voltage converter and the infrared beacon to generate an electrical pulse train convertible by the infrared beacon into a predetermined series of infrared pulses; and
an oscillator attached to trigger the microcontroller to initiate the electrical pulse train.

15. A physical positioning system comprising:
a light source removably attachable to a lighting fixture that supplies electrical power at a determined voltage, the light source having an attached voltage converter adapted to provide a reduced supplied voltage;
an infrared beacon powered at the reduced supplied voltage through an electrical connection to the voltage converter, the infrared beacon adapted to broadcast a data signal representative of a physical location;
a microcontroller attached between the voltage converter and the infrared beacon to generate an electrical pulse train convertible by the infrared beacon into a predetermined series of infrared pulses; and
a trigger circuit attached to trigger the microcontroller to initiate the electrical pulse train.

16. A physical positioning system comprising:
a light source removably attachable to a lighting fixture that supplies electrical power at a determined voltage, the light source having an attached voltage converter adapted to provide a reduced supplied voltage;
an infrared beacon powered at the reduced supplied voltage through an electrical connection to the voltage converter, the infrared beacon adapted to broadcast a data signal representative of a physical location;
a microcontroller attached between the voltage converter and the infrared beacon to generate an electrical pulse train convertible by the infrared beacon into a predetermined series of infrared pulses; and
a trigger circuit attached to trigger the microcontroller to initiate the electrical pulse train, the trigger circuit being activated by an infrared input signal.

17. A physical positioning system comprising:
a light source removably attachable to a lighting fixture that supplies electrical power at a determined voltage, the light source having an attached voltage converter adapted to provide a reduced supplied voltage;
an infrared beacon powered at the reduced supplied voltage through an electrical connection to the voltage converter, the infrared beacon adapted to broadcast a data signal representative of a physical location;
a microcontroller attached between the voltage converter and the infrared beacon to generate an electrical pulse train convertible by the infrared beacon into a predetermined series of infrared pulses; and
a trigger circuit attached to trigger the microcontroller to initiate the electrical pulse train, the trigger circuit being activated by a radio input signal.

18. A physical positioning system comprising:
a light source removably attachable to a lighting fixture that supplies electrical power at a determined voltage, the light source having an attached voltage converter adapted to provide a reduced supplied voltage;
an infrared beacon powered at the reduced supplied voltage through an electrical connection to the voltage converter, the infrared beacon adapted to broadcast a data signal representative of a physical location;
a microcontroller attached between the voltage converter and the infrared beacon to generate an electrical pulse train convertible by the infrared beacon into a predetermined series of infrared pulses; and
a trigger circuit attached to trigger the microcontroller to initiate the electrical pulse train, the trigger circuit being activated by a user activated switch input signal.

* * * * *